(12) United States Patent
Marzorati et al.

(10) Patent No.: US 11,579,691 B2
(45) Date of Patent: Feb. 14, 2023

(54) MID-AIR VOLUMETRIC VISUALIZATION MOVEMENT COMPENSATION

(71) Applicant: KYNDRYL, INC., New York, NY (US)

(72) Inventors: Mauro Marzorati, Lutz, FL (US); Gary Francis Diamanti, Wake Forest, NC (US); Jeremy R. Fox, Georgetown, TX (US); Sarbajit K. Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/329,248

(22) Filed: May 25, 2021

(65) Prior Publication Data
US 2022/0382369 A1 Dec. 1, 2022

(51) Int. Cl.
*G02B 30/50* (2020.01)
*G06F 3/01* (2006.01)
(Continued)

(52) U.S. Cl.
CPC ............. *G06F 3/013* (2013.01); *G02B 30/50* (2020.01); *G06F 3/0485* (2013.01);
(Continued)

(58) Field of Classification Search
CPC ........ G02B 30/50; G02B 30/52; G02B 30/54; G02B 30/56; G06F 3/04815;
(Continued)

(56) References Cited

U.S. PATENT DOCUMENTS

| 2003/0038928 A1* | 2/2003 | Alden | H04N 5/74 348/E5.143 |
| 2003/0142092 A1* | 7/2003 | Fitzmaurice | G06F 3/04815 345/419 |

(Continued)

FOREIGN PATENT DOCUMENTS

JP 2011170174 A 9/2011
KR 1020150140807 A 12/2015

OTHER PUBLICATIONS

K. Tajimi et al., "Stabilization method for floor projection with a hip-mounted projector" In ICAT 2010: Proc. 20th international conference on Artificial Reality and Telexistence, vol. 10, pp. 77-83. 2010.

(Continued)

*Primary Examiner* — Alexander Eisen
*Assistant Examiner* — Cory A Almeida
(74) *Attorney, Agent, or Firm* — John Kennel; Andrew M. Calderon; Calderon Safran & Cole P.C.

(57) ABSTRACT

A wearable computing device generates a volumetric visualization at a first position that is located in a three-dimensional space. The wearable computing device includes a volumetric source configured to create the volumetric visualization. The wearable computing device includes one or more sensors configured to determine movement of the wearable computing device. A movement of the wearable computing device is identified by the wearable computing device. Based on the movement the wearable computing device adjusts the volumetric source.

20 Claims, 7 Drawing Sheets

(51) Int. Cl.
  *G06F 3/0485* (2022.01)
  *G06F 3/04845* (2022.01)
  *G06F 3/04815* (2022.01)
  *G04G 21/02* (2010.01)
  *G06N 20/00* (2019.01)
  *G04G 9/00* (2006.01)

(52) U.S. Cl.
  CPC ...... *G06F 3/04815* (2013.01); *G06F 3/04845* (2013.01); *G04G 9/007* (2013.01); *G04G 21/02* (2013.01); *G06F 2203/04806* (2013.01); *G06N 20/00* (2019.01)

(58) Field of Classification Search
  CPC .............. G06F 3/04845; G06F 3/0485; G06F 2203/04806; G06N 20/00; G04G 9/007; G04G 21/02
  See application file for complete search history.

(56) References Cited

U.S. PATENT DOCUMENTS

| | | | |
|---|---|---|---|
| 2007/0205980 | A1 | 9/2007 | Dijk |
| 2018/0144287 | A1* | 5/2018 | Drayton ............. G06Q 30/0635 |
| 2019/0259212 | A1 | 8/2019 | Kamal et al. |
| 2020/0098335 | A1* | 3/2020 | Chen ..................... G09G 5/10 |
| 2020/0261822 | A1* | 8/2020 | Chau ......................... F41H 9/06 |

OTHER PUBLICATIONS

T. Konishi et al., "Projection stabilizing method for palm-top display with wearable projector." In ISWC 2009: Proc. 13th international symposium on Wearable Computers, pp. 13-20, 2009.

K. Nakata et al., "Projected image stabilization with pre-measurement data for movable projector," 2016 IEEE/SICE International Symposium on System Integration (SiI), Sapporo, Japan, pp. 242-247, 2016.

Y. Hosomizo et al., "A flying projector stabilizing image fluctuation," 2014 IEEE 3rd Global Conference on Consumer Electronics (GCCE), Tokyo, pp. 31-32, 2014.

S. Murata et al., "A stabilization method of projected images for wearable projector applications." Proc 13th International Conference on Ubiquitous Computing, pp. 469-470. 2011.

E. Choi et al., "An Implementation of Drone-Projector: Stabilization of Projected Image." Electronic Imaging 2020, No. 3, 3321-3325, 2020.

Mell, P. et al., "The NIST Definition of Cloud Computing", Recommendations of the National Institute of Standards and Technology, NIST Special Publication 800-145, 7 pages, Sep. 2011.

"Physicists create Star Wars-style 3D projections—just don't call them holograms", Nature, 7 pages, Jan. 24, 2018, found at: https://www.nature.com/articles/d41586-018-01125-y.

Smalley, D., Nygaard, E., Squire, K. et al. A photophoretic-trap volumetric display. Nature 553, 11 pages (2018), found at: https://doi.org/10.1038/nature25176.

Anonymous, "Understanding Success Criterion 2.5.4:Motion Actuation", https://www.w3.org/WAI/WCAG21/Understanding/motion-actuation, Date Unkown, accessed Aug. 25, 2022, 8 pages.

Severson, "IBM Research and The Michael J. Fox Foundation Develop Modeling Methodology to Help Understand Parkinson's Disease Using Machine Learning", https://www.IBM.com/blogs/research/2020/08/mjff-parkinsons-modeling/. Aug. 7, 2020, 7 pages.

Anonymous, "IBM Accessibility Requirements Empower your diverse user base by creating accessible products", https://www.IBM.com/able/requirements/requirements/, Date Unkown, accessed Aug. 31, 2022, 8 pages.

* cited by examiner

MID-AIR VOLUMETRIC VISUALIZATION MOVEMENT COMPENSATION

BACKGROUND

The present disclosure relates to volumetric visualizations, and more specifically, to adjusting the path of a volumetric source based on movement of a mid-air volumetric visualization.

Volumetric visualizations may be a visual projection that includes depth and may be observed by a user from multiple perspectives. Volumetric visualizations may be useful for user to be able to see an element from multiple angles or to be able to intuitively understand how an object (represented by the visualization) relates to other objects. Volumetric visualizations may be created by a volumetric source that remains steady, allowing for the volumetric source to trace a very specific path through a three-dimensional space.

SUMMARY

According to embodiments, disclosed are a method, system, and computer program product.

A wearable computing device generates a volumetric visualization at a first position that is located in a three-dimensional space. The wearable computing device includes a volumetric source configured to create the volumetric visualization. The wearable computing device includes one or more sensors configured to determine movement of the wearable computing device. A movement of the wearable computing device is identified by the wearable computing device. Based on the movement the wearable computing device adjusts the volumetric source.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
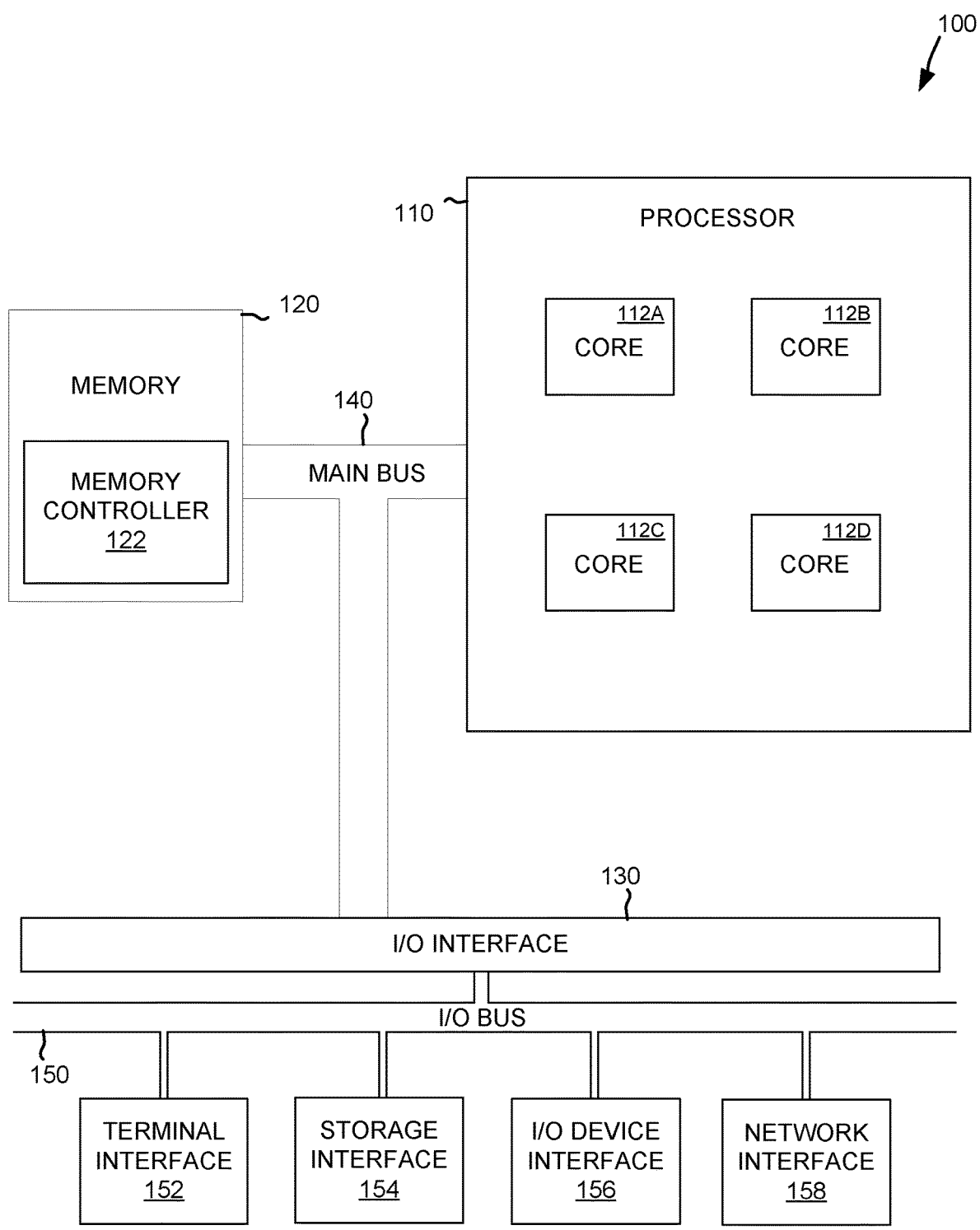
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to volumetric visualizations, more particular aspects relate to adjusting the path of a volumetric source based on movement of a mid-air volumetric visualization. While the present disclosure is not necessarily limited to such applications, various aspects of the disclosure may be appreciated through a discussion of various examples using this context.

Computer generated visualizations, may include the creation, recording, distribution, and/or otherwise providing of imagery by computers for consumption by users. Visualization may be an indispensable part of the field of computing. Specifically, visualizations may be used across all disciplines of computing, such as medicine, business, and entertainment. A large number of users may consume content primarily through computer generated visualizations. For example, a user may perform teleconferencing with others through a video conference using a webcam of a network-connected computer. In another example, a user may read and comprehend the schematics of an automobile for repair and/or maintenance through a display of a smartphone. In yet another example, a user may consume movies through a television streaming set-top box that renders an image on the television.

As many users are visual learners, they may derive more understanding and more intuitively understand information if they are provided with additional visual information. One source of additional visual information may be that of visualizations that have multiple perspectives. For example, a user may understand only a limited amount of information about particular subject from a still two-dimensional image such as a drawing or an image capture. The same user may achieve a greater understanding about the same subject from a two-dimensional video such as a video image capture or a computer-generated animation. Another type of visualization that may provide increased information to a user is a multi-dimensional or multi-perspective visualization. A multi-dimensional visualization may be an image of a subject that may be perceived from different angles or perspectives, such as a three-dimensional rendering of a subject (e.g., a three-dimensional image of a manufactured widget, a multi-perspective rendering of an architectural space, a computer-rendered representation of a part of the human body, a three-dimensional animation of an animal).

There are many ways to make multi-perspective visualizations, but each of these has certain drawbacks or limitations in display and visualization technology. One technique may be the use of a two-dimensional display device that renders a multi-perspective visualization. The two-dimensional display device has limitations in that it cannot simultaneously provide multiple perspectives. For example, a two-dimensional visualization may display a three-dimensional ("3D") rendering of a mechanical part. The 3D rendering of the mechanical part may play a series of two-dimensional images that depict rotation and/or translation of the part in a predetermined sequence or animation. The predetermined sequence may not be helpful or intuitive for a user to comprehend operation, installation, or usage of the mechanical part. An interactive real-time generation of the 3D rendering may provide some improvement, in that a user may adjust the 3D rendering. The interactive real-time generation may have other drawbacks, however. To view an object in the real world, a user may manipulate the object directly by picking it up and moving it through spaces (e.g., rotating, drawing it closer to the gaze of a user). The user may also move their head or entire body to change their perspective on an object in the real world. Both object manipulation, and movement of the head and/or body may be intuitive for a user to consume or view the multi-perspective visualization.

Unfortunately, a two-dimensional display does not provide for an intuitive consumption of multi-perspective visualizations. Specifically, a user may have to indirectly manipulate the object through a mouse, keyboard, or other command. These indirect interactions may not allow for a user to focus on the subject of the multi-perspective visualization. Some displays may provide touch interactions (e.g., touchscreens), however these may also be unintuitive. For example, a user may have to perform very platform-specific or software-specific gestures that a user has to learn. Once learned the touchscreen requires the user to place their hand between the rendered subject and their view or gaze, which impedes consumption and/or viewing during these touch-based interactions.

Multi-perspective display devices may provide some benefits, but they also have other drawbacks. For instance, a virtual reality ("VR") and/or augmented reality ("AR") headset may allow for a user to view multi-perspective visualizations. These headsets are worn on the head of the user and over the eyes of the user. The VR headset may render an image alone in a virtual world, and AR headsets may render an image composited into a real-world space. Each of these headsets may require the user to have computing and rendering devices worn on the head of the user and may be bulky or uncomfortable to wear. Additionally, each requires the use of display devices located proximate to the user's eyes (e.g., within a few inches of the eyes of the user). The proximity to the eyes may have other downsides, such as the significant processing and rendering requirements to create a visualization of sufficient resolution and complexity.

Holograms may be another way to provide multi-perspective images for viewing by a user. Unfortunately, holograms require specialized equipment and techniques to capture the interference pattern. In addition, many holograms are still images that may lack the context of a moving pictures (e.g., a two-dimensional video may contain a subject with a camera rotating around the subject and the video may serial depict additional perspectives and visual information about the subject). Further, the still holographic images may only provide a narrow field of view. For example, during capture of an interference pattern of light by a redirected laser beam, a hologram may be generated from a certain perspective. The certain perspective may be the front of a person, or the side of an automobile. The certain perspective, however, is limited in that other sides (e.g., the underside of an automobile, the back side of a person) cannot be inspected from a hologram.

A volumetric display may allow for a user to view a volumetric visualization or volumetric image from multiple perspectives, but there are certain drawbacks. For instances, a swept-volume display may project or display a volumetric rendering of the item based on a larger apparatus. In one example, a volumetric display may render into a rapidly moving thin medium configured to receive projected light. In another example, a volumetric display may be a three-dimensional grouping or arrangement of light-emitting diodes. These volumetric displays may be large or unwieldly and may require placement in limited areas (e.g., on a stand, at a table) away from a work site. For example, a volumetric display may be fixed onto a desktop or mounted on a platform in an automobile garage. A user that is working on a car may have to leave the work area near the car to view the volumetric display.

Another volumetric display technology may include a device configured to generate a mid-air volumetric display. The mid-air volumetric display may be configured to project into a three-dimensional space of one or more particles. The mid-air volumetric display may generate a volumetric visualization by the use of a plurality of volumetric sources. These volumetric sources may be diodes, lasers, plasma-generators, or other relevant technology. A first volumetric source may be considered a guiding source. For instance, a first laser of a mid-air volumetric display may be configured to trap, tweeze, adjust, or otherwise manipulate a particle in a three-dimension real-world space. For example, a particle may be moved around in a room of a home into a plurality of positions (e.g., along a path). The guiding source may be configured to push, pull, guide, trace, control or otherwise move the particle along a pre-set or pre-determined path in the three-dimensional space.

A second volumetric source of the mid-air volumetric display may be considered a rendering source. The rendering source may be configured to paint, color, illuminate, render, or otherwise interact with the particle such that the particle is visible to a user. Specifically, the second volumetric source may be a visible-light laser that creates a beam of visible-light. The second volumetric source may be directed or aimed at the particle as it travels along or is guided on the pre-set or pre-determined path. The second volumetric source may project or direct the visible light (e.g., reg, green, blue) onto the particle, causing the particle to emit light in all directions as it moves along the path by the first volumetric source.

Consequently, based on the movement of the particle by the guiding source and the illumination of the particle by the rendering source, a volumetric visualization may be created by the mid-air volumetric display. For example, a guiding source may trace a path in a three-dimensional space of an automotive fastener and the rendering source may illuminate the path, such that in mid-air an three dimensional image (e.g., a volumetric visualization) of the automotive fastener is viewable by a viewer. This volumetric visualization may be viewed from any side (including a top or bottom side), and may be projected into a position located in three-dimensional space that is useful to the viewer, such as just above a physical automobile part that is configured to accept automotive fasteners. This may lead to practical advantages, such as a user more intuitively understanding the relationship between components.

It may be desirable to use a volumetric display, such as a mid-air volumetric display, in many environments, but there are technical challenges that may be difficult to overcome. One challenge may be the precise movement or aiming of the guiding source of the volumetric sources. Specifically, as guiding source moves a particle, the particle may be lost or not be held or tweezed if the mid-air volumetric display is subject to any movement. Another issue is that the multiple volumetric sources may not create a volumetric visualization if they are not placed or kept in sync with each other. As the rendering source is reliant on projecting light onto the particle being guided by the guiding source, any movement of either source may result in an intermittent or total loss of the creation of the volumetric visualization.

Conversely, it would be desirable to utilize a mid-air volumetric display in a wearable computing device. Wearable computing devices are increasingly being used to perform computing tasks for users. For example, a smart watch may be a wearable device that includes a processor and memory, and a method of interaction, such as a display and/or audio transceiver. While a screen may be configured to display information of a wearable device, the screen may have drawbacks, such as forcing a user to look directly at the device. This may be a practical problem, for example, when a user is using their limbs to assemble furniture, the user may not be able to simultaneously look at the screen to view directions on how to assemble the furniture. For example, the act of a user moving her arm to wrench a bolt tight on a frame may cause a wearable computing device to move along with the arm. While a mid-air volumetric display would permit a user to view volumetric visualizations even without looking at the wearable device screen, but the movement (both anticipated and unanticipated) of the wearable computing device may make such wearable volumetric displays technically difficult to achieve.

Mid-Air Volumetric Visualization Movement Compensation (MVMC) may alleviate the technical problems associated with volumetric displays on wearable computing devices. MVMC may be a computing device, such as a wearable computing device, configured to generate a volumetric visualization in a three-dimensional space. Specifically, the wearable computing device may include a plurality of volumetric sources configured to render or create the volumetric visualization, such as one or more lasers including visible light lasers and near-visible light lasers. The MVMC may be configured to identify movement of the wearable computing device. Specifically, one or more movement sensors, such as one or more inertial measurement units (IMUs) embedded into the wearable device may be configured to determine movement. Based on the identified movement, the wearable computing device may adjust the volumetric sources. The adjusting of the sources may be minor to correct for movement of a user, and to facilitate movement, guiding, and/or tracing of the particle such that a visible-light volumetric source can be directed to intersect the particle during movement of the origin of the volumetric source (e.g., the wearable computing device).

MVMC may facilitate benefits to accessibility and useability for users having various abilities and user statuses. A user status may be that a user has certain specific movement characteristics, such as a muscle-skeletal ailment (e.g., Parkinson's, ALS, Tremors). For example, the identification of movements by an MVMC may be beneficial to generate a volumetric visualization based on resting tremors (tremors that occur when the muscles are relaxed, such as when the hands are resting on a user's lap) and action tremors (tremors that occur while the muscles are contracted because of voluntary movement). A user status may be a user being of a certain age (e.g., a young user may have unsteady hands, an older user may have reduced balance). The MVMC may be configured to compensate or adjust the movement of the volumetric source, such that the volumetric source can still create a mid-air volumetric visualization.

The MVMC may facilitate technical improvements in wearable computing for all users regardless of movement status. Specifically, the MVMC may allow a user view content from a wearable computing device that appears relatively static with respect to wrist movement pattern, which could even be involuntary, such as a nervousness or repetitive movement. For example, a user may be typing on a keyboard and the IMUs of the MVMC may capture the movement of the user and adjust or compensate the volumetric sources to generate a volumetric visualization that appears to be in a fixed position in a three-dimensional space. The relatively fixed position may be beneficial as a user may more easily concentrate on working and may be able to view or comprehend the volumetric visualization without distraction or with reduced eyestrain.

The MVMC may be configured to operate with respect to the content of the user. This may be technically beneficial, as it may be advantageous to have a wearable computing device configured to broadcast or demonstrate a particular object as a volumetric visualization for viewing and comprehending there may be privacy issues. In detail, because a volumetric visualization may be viewed from multiple perspectives, anyone in the area of vicinity of the wearable computing device may also view the volumetric visualization, and this may be unwanted by the user of the MVMC.

Consequently, the MVMC may be configured to be aware of and respect the privacy of a user. Specifically, a processor of the MVMC may be configured to analyze the type, class, category, data, or metadata of any content that is to be created as a volumetric visualization. If any content contains confidential data (e.g., based on matching the content to be created with a predetermined category as private, based on determining a personal contact information that is a part or portion of a potential volumetric visualization), then the smartwatch will not create the midair volumetric visualization. The MVMC may also notify the user that the volumetric visualization was not displayed (e.g., a haptic motor in the wearable computing device may actuate with a haptic effect to notify the user, or a display of the wearable computing device may notify the user of the private information).

The MVMC may determine to create or not create a particular volumetric visualization based on a profile. The profile may be a configurable profile that allows the user to specify certain documents, document types, or categories of content that should not displayed, created, and/or traced into a three-dimensional space ("created volumetrically"). The MVMC may be configured to determine whether to generate or not generate a volumetric visualization based on a location. Specifically, one or more position sensors in the wearable computing device (or in a paired mobile device, e.g., a smartphone of the user), such as a global positioning system ("GPS") sensor, may be configured to provide location information to the MVMC. The MVMC may use the location information to override or disable certain volumetric visualization generation based on the wearable computing device being in a particular location. The location and content-based filtering or selective enablement of the volumetric visualization generation may be beneficial in certain real-world scenarios. For example, the MVMC may detect that the wearable computing device is located in a workplace, at a movie theater, in an elevator, or in a waiting room of a doctor's office. This capability may provide a better user experience and enhance the technologies adoption.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
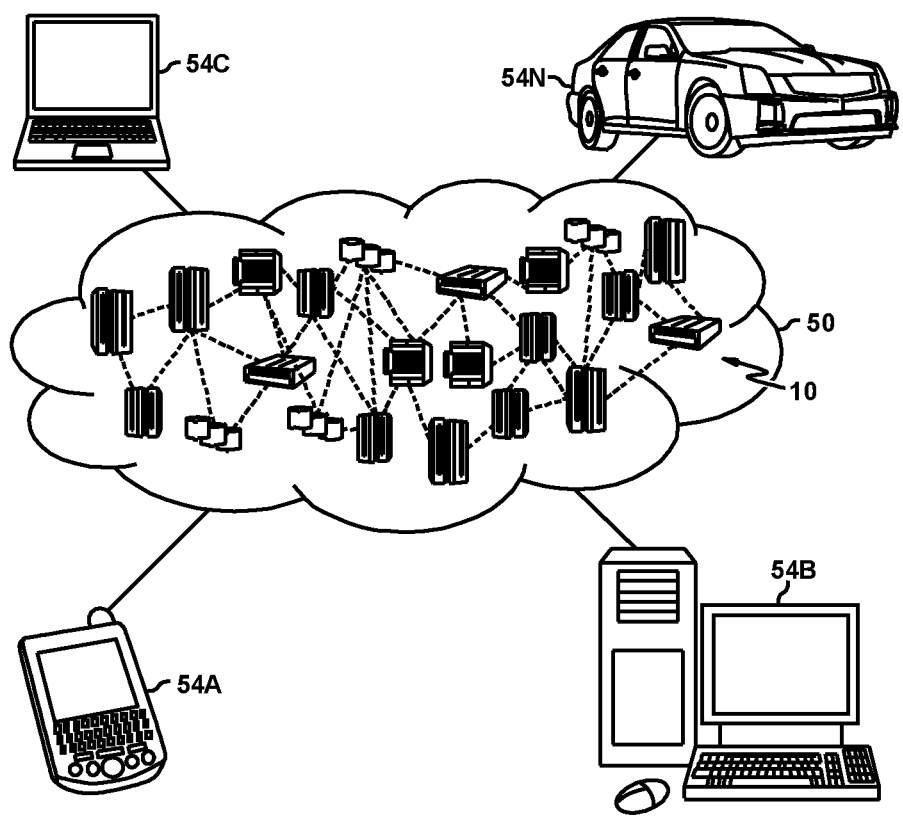
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
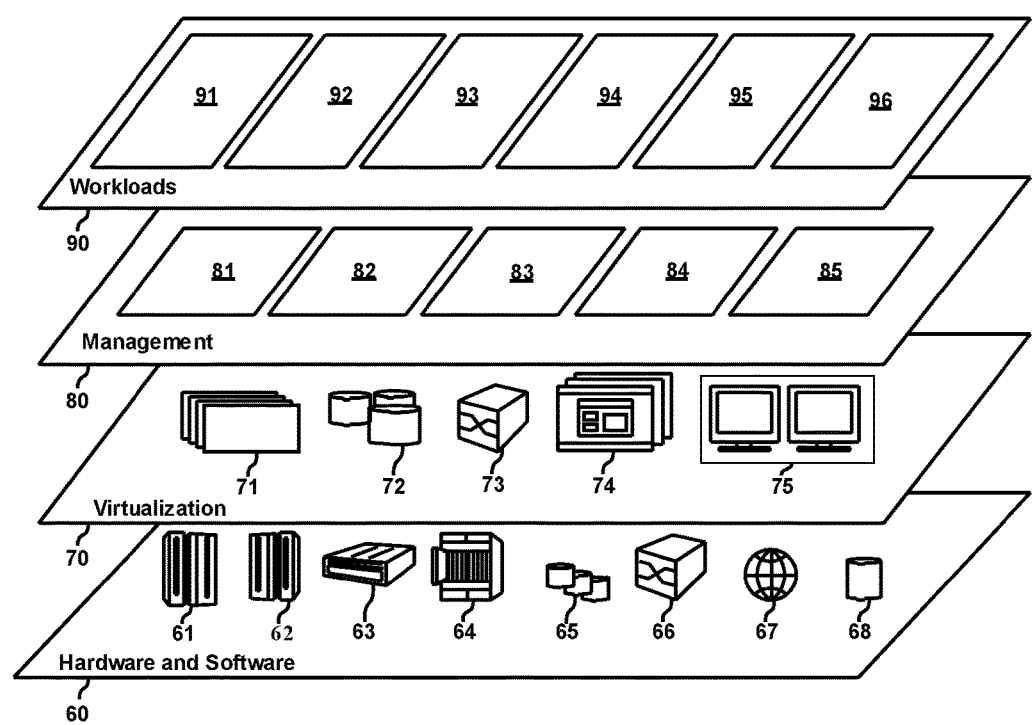
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the MVMC 96.

Figure 4:
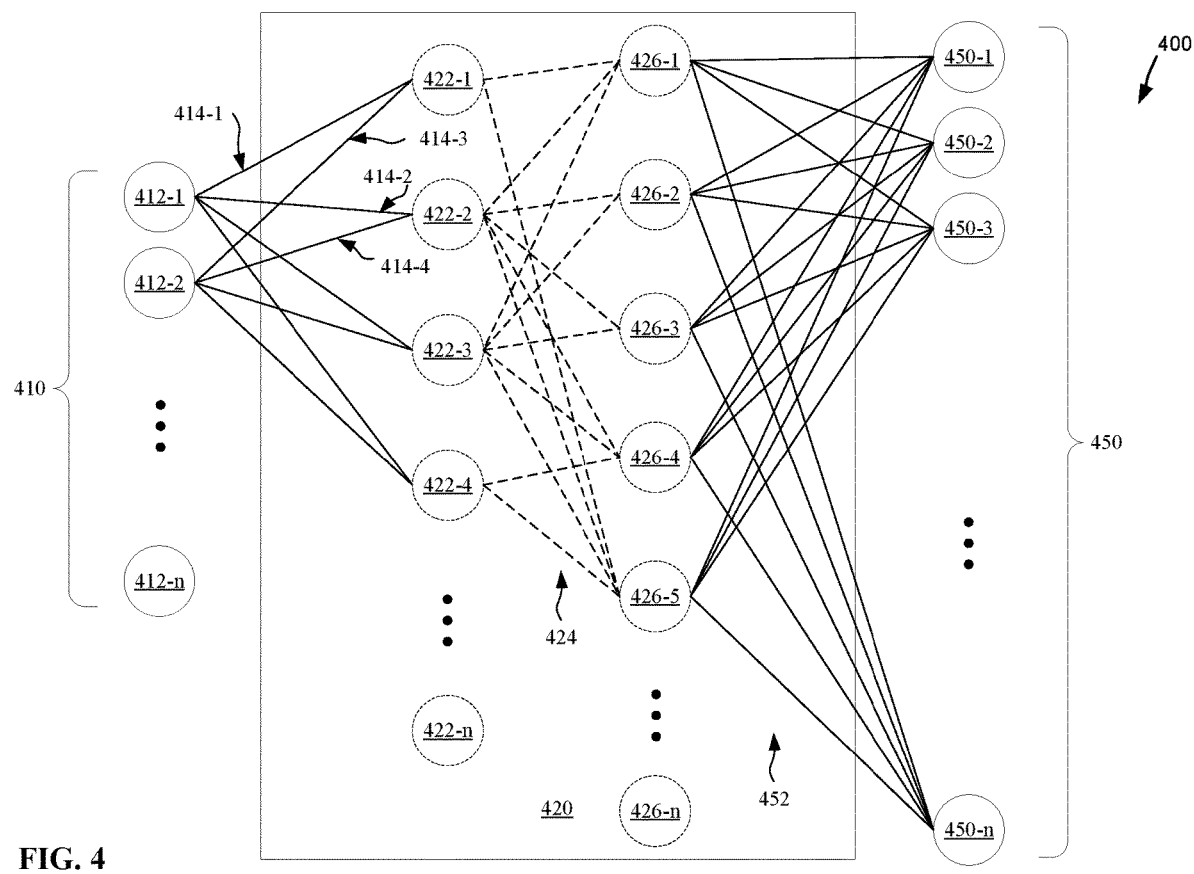
FIG. 4 depicts an example neural network representative of one or more machine learning models configured to perform one or more operations of Mid-Air Volumetric Visualization Movement Compensation ("MVMC"), consistent with embodiments of the present disclosure.

FIG. 4 depicts an example neural network (alternatively, "network") 400 representative of one or more machine learning models configured to perform one or more operations of Mid-Air Volumetric Visualization Movement Compensation, consistent with embodiments of the present disclosure. The neural network 400 is made up of a plurality of layers. The network 400 includes an input layer 410, a hidden section 420, and an output layer 450. Though network 400 depicts a feed-forward neural network, it should be appreciated that other neural networks layouts may also be configured to perform MVMC, such as a recurrent neural network layout (not depicted). In some embodiments, the network 400 may be a design-and-run neural network and the layout depicted may be created by a computer programmer. In some embodiments, the network 400 may be a design-by-run neural network, and the layout depicted may be generated by the input of data and by the process of analyzing that data according to one or more defined heuristics. The network 400 may operate in a forward propagation by receiving an input and outputting a result of the input. The network 400 may adjust the values of various components of the neural network by a backward propagation (back propagation).

The input layer 410 includes a series of input neurons 412-1, 412-2, up to 412-$n$ (collectively, 412) and a series of input connections 414-1, 414-2, 414-3, 414-4, etc. (collectively, 414). The input layer 410 represents the input from data that the neural network is supposed to analyze (e.g., one or more movements of a user that wears a wearable computing device). Each input neuron 412 may represent a subset of the input data. For example, the neural network 400 is provided with a plurality of movement variables containing various flagged and categorized movements that represent various users having various characteristics and status (e.g., tremors, age-related movement disorders) as input, and the each example of a characteristic may be represented by one or more input neurons 412.

The input connections 414 represent the output of the input neurons 412 to the hidden section 420. Each of the input connections 414 varies depending on the value of each input neuron 412 and based upon a plurality of weights (not depicted). For example, the first input connection 414-1 has a value that is provided to the hidden section 420 based on the input neuron 412-1 and a first weight. Continuing the example, the second input connection 414-2 has a value that is provided to the hidden section 420 based on the input neuron 412-1 and a second weight. Further continuing the example, the third input connection 414-3 based on the input neuron 412-2 and a third weight, etc. Alternatively stated, the input connections 414-1 and 414-2 share the same output component of input neuron 412-1 and the input connections 414-3 and 414-4 share the same output component of input neuron 412-2; all four input connections 414-1, 414-2, 414-3, and 414-4 may have output components of four different weights. Though the neural network 400 may have different weightings for each connection 414, some embodiments may contemplate weights that are similar. In some embodiments, each of the values of the input neurons 412 and the connections 414 may necessarily be stored in memory.

The hidden section 420 includes one or more layers that receive inputs and produce outputs. The hidden section 420 includes a first hidden layer of calculation neurons 422-1, 422-2, 422-3, 422-4, up to 422-*n* (collectively, first hidden layer 422); a second hidden layer of calculation neurons 426-1, 426-2, 426-3, 426-4, 426-5, up to 426-*n* (collectively second hidden layer 426); and a series of hidden connections 424 coupling the first hidden layer and the second hidden layer. It should be appreciated that neural network 400 only depicts one of many neural networks capable of various operations related to MVMC consistent with some embodiments of the disclosure. Consequently, the hidden section 420 may be configured with more or less hidden layers (e.g., one hidden layer, seven hidden layers, twelve hidden layers, etc.)—two hidden layers are depicted for example purposes.

The first hidden layer 422 includes the calculation neurons 422-1, 422-2, 422-3, 422-4, up to 422-*n*. Each calculation neuron of the first hidden layer 422 may receive as input one or more of the connections 414. For example, calculation neuron 422-1 receives input connection 414-1 and input connection 414-2. Each calculation neuron of the first hidden layer 422 also provides an output. The output is represented by the dotted lines of hidden connections 424 flowing out of the first hidden layer 422. Each of the calculation neurons 422 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., a sigmoid neurons or other logistic functions, tanh neurons, softplus functions, softmax functions, rectified linear units, etc.). In some embodiments, each of the calculation neurons 422 also contains a bias (not depicted). The bias may be used to decide the likelihood or valuation of a given activation function. In some embodiments, each of the values of the biases for each of the calculation neurons must necessarily be stored in memory.

The neural network 400 may include the use of a sigmoid neuron for the activation function of calculation neuron 422-1. An equation (Equation 1, stated below) may represent the activation function of calculation neuron 412-1 as f(neuron). The logic of calculation neuron 422-1 may be the summation of each of the input connections that feed into calculation neuron 422-1 (i.e., input connection 414-1 and input connection 414-3) which are represented in Equation 1 as j. For each j the weight w is multiplied by the value x of the given connected input neuron 412. The bias of the calculation neuron 422-1 is represented as b. Once each input connection j is summed the bias b is subtracted. Finalizing the operations of this example as follows: given a larger positive number of results from the summation and bias in activation f(neuron), the output of calculation neuron 422-1 approaches approximately 1; given a larger negative number of results from the summation and bias in activation f(neuron), the output of calculation neuron 422-1 approaches approximately 0; and given a number somewhere in between a larger positive number and a larger negative number of results from the summation and bias in activation f(neuron), the output varies slightly as the weights and biases vary slightly.

$$f(\text{neuron}) = \frac{1}{1 + \exp\left(-\sum_j w_j x_j - b\right)} \qquad \text{Equation 1}$$

The second hidden layer 426 includes the calculation neurons 426-1, 426-2, 426-3, 426-4, 426-5, up to 426-*n*. In some embodiments, the calculation neurons of the second hidden layer 426 may operate similarly to the calculation neurons first hidden layer 422. For example, the calculation neurons 426-1 to 426-*n* may each operate with a similar activation function as the calculation neurons 422-1 to 422-*n*. In some embodiments, the calculation neurons of the second hidden layer 426 may operate differently to the calculation neurons of the first hidden layer 422. For example, the calculation neurons 426-1 to 426-*n* may have a first activation function, and the calculation neurons 422-1 to 422-*n* may have a second activation function.

Similarly, the connectivity to, from, and between the various layers of the hidden section 420 may also vary. For example, the input connections 414 may be fully connected to the first hidden layer 422 and hidden connections 424 may be fully connected from the first hidden layer to the second hidden layer 426. In some embodiments, fully connected may mean that each neuron of a given layer may be connected to all the neurons of a previous layer. In some embodiments, fully connected may mean that each neuron of a given layer may function completely independently and may not share any connections. In a second example, the input connections 414 may not be fully connected to the first hidden layer 422 and the hidden connections 424 may not be fully connected from the first hidden layer to the second hidden layer 426.

Further, the parameters to, from, and between the various layers of the hidden section 420 may also vary. In some embodiments, the parameters may include the weights and the biases. In some embodiments, there may be more or less parameters than the weights and biases. For purposes of example, neural network 400 may be in the form of a convolutional neural network or convolution network. The convolutional neural network may include a sequence of heterogeneous layers (e.g., an input layer, a convolution layer, a pooling layer, and an output layer). In such a network, the input layer may hold the raw pixel data of an image in a 3-dimensional volume of width, height, and color. The convolutional layer of such a network may output from connections that are only local to the input layer to identify a feature in a small section of the movement data (e.g., the vibration of a left wrist based on a left index finger of a user that moves during typing on a keyboard, the shaking of a right arm of a user due to a physical manifestation of a nervous condition causing a semi-voluntary spasm in a muscle of the right arm, etc.). Given this example, the convolutional layer may include weights and biases, as well as, additional parameters (e.g., depth, stride, and padding). The pooling layers of such a network may take as input the output of the convolutional layers but perform a fixed function operation (e.g., an operation that does not take into account any weight or bias). Also given this example, the pooling layer may not contain any convolutional parameters and may also not contain any weights or biases (e.g., performing a down-sampling operation).

The output layer 450 includes a series of output neurons 450-1, 450-2, 450-3, up-to 450-*n* (collectively, 450). The output layer 450 holds a result of the analyzation of the neural network 400. In some embodiments, the output layer 450 may be a categorization layer used to identify a feature of the input to the network 400. For example, the network 400 may be a classification network trained to identify Arabic numerals. In such an example, the network 400 may include ten output neurons 450 corresponding to which Arabic numeral the network has identified (e.g., output neuron 450-2 having a higher activation value than output neurons 450 may indicate the neural network determined an image contained the number '1'). In some embodiments, the output layer 450 may be a real-value target (e.g., trying to predict a result when an input is a previous set of results) and there may be only a singular output neuron (not depicted). The output layer 450 is fed from an output connection 452. The output connection 452 provides the activations from the hidden section 420. In some embodiments, the output connections 452 may include weights and the output neurons 450 may include biases.

Training the neural network depicted by neural network 400 may include performing back propagation. Back propagation is different from forward propagation. Forward propagation may include feeding of data into the input neurons 410; performing the calculations of the connections 414, 424, 452; and performing the calculations of the calculation neurons 422 and 426. The forward propagation may also be the layout of a given neural network (e.g., recurrence, number of layers, number of neurons in one or more layers, layers being fully connected or not to other layers, etc.). Back propagation may be used to determine an error of the parameters (e.g., the weights and the biases) in the network 400 by starting with the output neurons 450 and propagating the error backward through the various connections 452, 424, 414 and layers 426, 422, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation the result or determination may be an incorrect determination. The training data may be in the form of a corpus of data; specifically, a movement corpus that includes a series of inputs and a predetermined categorization of various user statuses.

For example, neural network 400 may be a classification network; may be provided with a series of values from a movement corpus as input that contains the movement data of various users; and may determine that a first user of the movement corpus is a young child with immature body control is most likely movement status of a user and is second most likely a user is a mature adult with reduced flexibility in positioning and manipulating their limbs and is third most likely a user afflicted with tremors. Continuing the example, performing a back propagation may alter the values of the weights of connections 414, 424, and 452; and may alter the values of the biases of the first layer of calculation neurons 422, the second layer of calculation neurons 426, and the output neurons 450. Further continuing the example, the performance of the back propagation may yield a future result that is a more accurate classification of the input that contains the first user (e.g., more closely ranking the first user afflicted with tremors, the first user is a mature adult, then the first user is a young child in order of most likely to least likely).

Equation 2 provides an example of the objective function ("example function") in the form of a quadratic cost function (e.g., mean squared error)—other functions may be selected, and the mean squared error is selected for example purposes. In Equation 2, all of the weights may be represented by w and biases may be represented by b of neural network 400. The network 400 is provided a given number of training inputs n in a subset (or entirety) of training data that have input values x. The network 400 may yield output a from x and should yield a desired output y(x) from x. Back propagation or training of the network 400 should be a reduction or minimization of the objective function 'O(w,b)' via alteration of the set of weights and biases. Successful training of network 400 should not only include the reduction of the difference between the answer a and the correct answers y(x) for the input values x, but given new input values (e.g., from additional training data, from validation data, etc.).

$$O(w, b) \equiv \frac{1}{2n} \sum_x \|y(x) - a\|^2 \qquad \text{Equation 2}$$

Many options may be utilized for back propagation algorithms in both the objective function (e.g., mean squared error, cross-entropy cost function, accuracy functions, confusion matrix, precision-recall curve, mean absolute error, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the neural network 400 may be small in any given iteration. Back propagation algorithms may need to be repeated for many iterations to perform accurate learning as a result of the necessitated smallness of any given iteration.

For example, neural network 400 may have untrained weights and biases, and back propagation may involve the stochastic gradient descent to train the network over a subset of training inputs (e.g., a batch of 10 training inputs from the entirety of the training inputs). Continuing the example, network 400 may continue to be trained with a second subset of training inputs (e.g., a second batch of 10 training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.). Further, network 400 may be evaluated to quantify the performance of evaluating a dataset, such as by use of an evaluation metric (e.g., mean squared error, cross-entropy cost function, accuracy functions, confusion matrix, precision-recall curve, mean absolute error, etc.).

It should be appreciated that network 400 as described above is only one instance of an artificial learning technique and/or machine learning operation for performing various operations of MVMC, consistent with embodiments of the disclosure. Certain other instances of network 400 may be configured to perform similar movement operations or various other operations unrelated to the identification or categorization of movement. In a first example, network 400 may be configured to identify a status of a user, including identification of a predetermined movement pattern, that may allow for the adjustment of a volumetric source of a wearable computing device. The network 400 may be configured, based on receiving input of movement from movement sensors, a prediction of an upcoming or future movement of a user. The network 400 may be considered as performing historical learning, and consequently the wearable computing device configured with MVMC may be considered as predicting a next movement (e.g., a direction, an amplitude, a pattern) of movement of a body part of the user. Based on the predicted movement of the user, the MVMC may instruct the MVMC to adjust a volumetric source to create midair volumetric visualization taking into account the predicted movement. Consequently, the volumetric source may appear relatively static with respect to eye focus direction of a user despite voluntary or involuntary movement of a user that wears the wearable computing device.

In a second example, network 400 may be configured as a semi-supervised training approach to protect privacy and confidential information. Specifically, network 400 may be configured to inspect content that is received by a wearable computing device and is scheduled, prompted, or otherwise about to be rendered by the wearable computing devise. Network 400, based on a semi-supervised training, may be configured to determine if it is appropriate to display certain content as a volumetric visualization. Network 400 may be updated, e.g., the various weights and biases tuned, based on use of the wearable computing device; such as based on receiving feedback from a user and tune the accuracy of network 400.

Figure 5A:
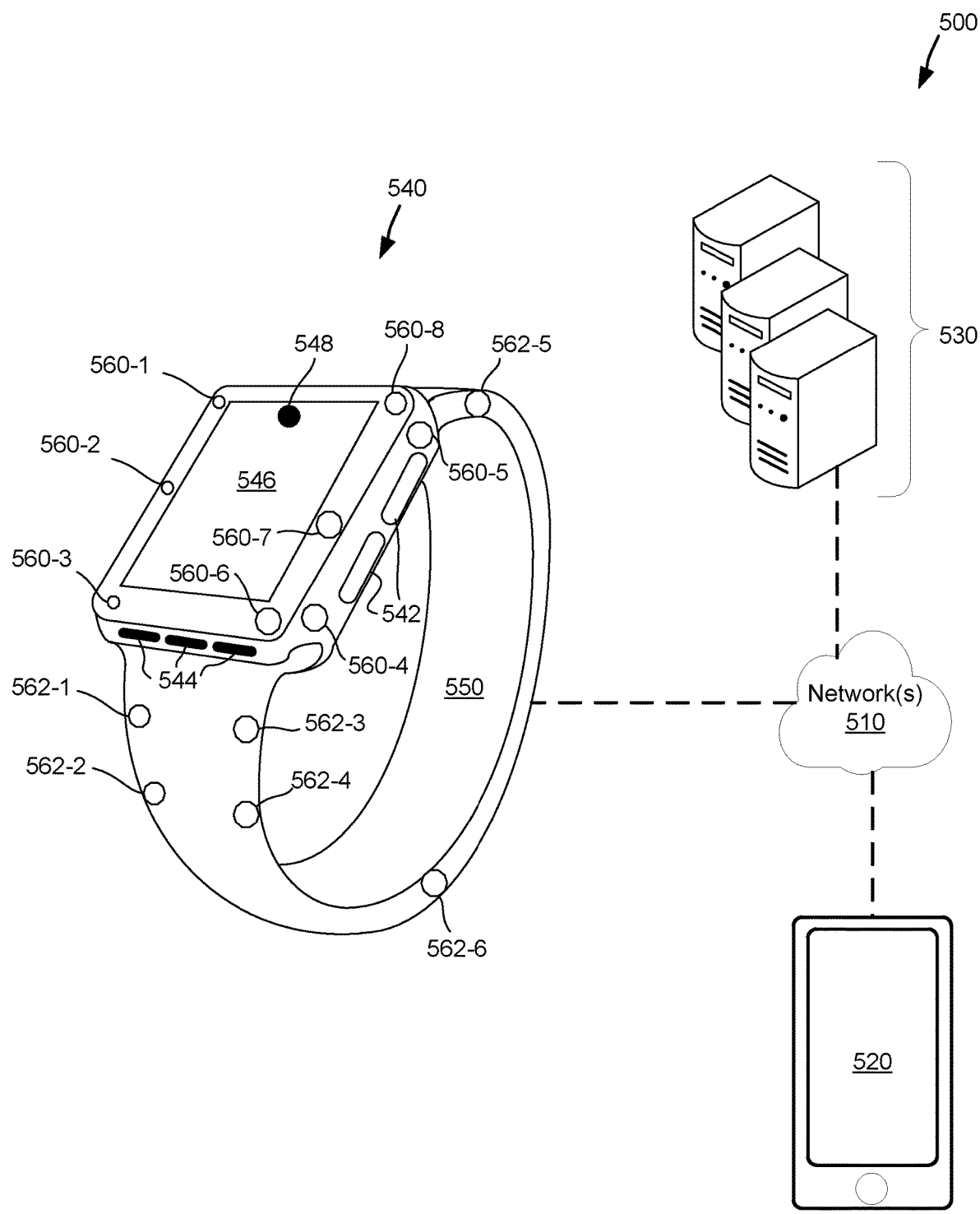
FIG. 5A depicts an example system of MVMC, consistent with some embodiments of the disclosure.

FIG. 5A depicts an example system 500 of Mid-Air Volumetric Visualization Movement Compensation ("MVMC"), consistent with some embodiments of the disclosure. System 500 may include the following: one or more communications networks 510; a paired local computing device 520; one or more remote servers 530; and a wearable computing device 540. The networks 510 may be configured to facilitate communication between the various other component of system 500. Networks 510 may include a personal area network using a relevant wired or wireless protocol (e.g., Bluetooth, IEEE 802.15). Networks 510 may include a local area network using a relevant wired or wireless protocol (e.g., Wi-Fi™, IEEE 802.3, IEEE 802.11). Networks 510 may include or be a part of larger network or a remote network configured to provide communication across larger distances (e.g., the Internet).

Paired local computing device ("computing device") 520 may be a computing device configured to perform one or more portions of MVMC. Specifically, computing device 520 may include a processor, memory, and I/O (e.g., computer system 100, a smartphone, a tablet, a laptop computer). Computing device 520 may include a more capable processor than wearable computing device 540. Computing device 520 may be assigned to perform one or more processing intensive workloads as part of system 500. For example, computing device 520 may be configured to execute network 400. Computing device 520 may include a relatively larger amount (e.g., 1.5 times, double, ten times) of storage space than wearable computing device 540. Computing device 520 may be assigned to store and retrieve one or more data intensive workloads as part of system 500. For example, computing device 520 may be configured to hold a library of three-dimensional files (e.g., STL files, a mesh file including vertices and edges, quad-based meshes, unstructured meshes including triangles and higher-level polygons). The computing device 520 may provide to the wearable computing device 540 the files for creation of a volumetric visualization (e.g., by transferring the files through networks 510).

Servers 530 may be one or more computing devices configured to perform one or more operations of system 500. For example, server 530 may be a single desktop computer system (e.g., computer 100). Server 530 may be a computing environment made up of a plurality of computer systems. Server 530 may be an abstracted computing apparatus (e.g., cloud computing environment 50). Server 530 may be assigned to perform one or more processing intensive workloads as part of system 500. For example, server 530 may be configured to train network 400.

The wearable computing device 540 may be a computing device including a processor, memory, and I/O (e.g., computer 100). The wearable computing device 540 may be a system embedded into an integrated circuit and powered by a battery or other relevant power source (not depicted), the wearable computing device may be affixed to a band 550. The band 550 may be made of a knit fiber, textile, polymer, rubber, or other relevant material. In some embodiments, the band 550 may be communicatively coupled to the wearable computing device 540. For example, the wearable computing device 540 may include a plurality of electrical connections (not depicted) adjacent to the band 550. Further, the band 550 may include one or more embedded electrical connections (not depicted) that are configured to receive electrical signals from the plurality of electrical connections.

Various embedded or permanently affixed components may be placed in the band 550 and may be communicatively coupled, by way of the embedded electrical connections, to the wearable computing device 540.

Wearable computing device 540 may include various components facilitating operation and interaction with a user. For example, wearable computing device 540 may include the following: one or more physical buttons 542, configured to accept presses from fingers of a user; an audio I/O 544, configured to send and receive sounds; a display 546, configured to present two-dimensional information; and a camera 548, configured to capture visual information of an environment. The buttons 542 may be configured to allow a user to move through and select various options and call upon various commands. The audio I/O 544 may be an audio transceiver configured to reproduce audio such as music or communicate auditory messages to a user. The audio I/O 544 may also be configured to receive verbal commands or listen to and detect auditory information in an environment. In some embodiments, the display 546 may be a touchscreen that is also capable of receiving gestures from a finger of a user. The camera 548 may be configured to capture a user. In some embodiments, the camera 548 may be configured to capture an image of the user, and the wearable computing device 540 may be configured to determine from the captured image whether the user is looking at the wearable computing device.

The wearable computing device 540 may also be configured to provide a volumetric visualization. Specifically, the wearable computing device 540 may include a plurality of volumetric sources 560-1, 560-2, 560-3, 560-4, 560-5, 560-6, 560-7, and 560-8 (collectively, 560). The band 550 may include one or more additional volumetric sources 562-1, 562-2, 562-3, 562-4, 562-5, and 562-6 (collectively, 562). Each of the volumetric sources 560 and additional volumetric sources 562 may be configured to create a mid-air volumetric visualization. For example, each of the volumetric sources 560 and additional volumetric sources 562 may be a laser or other relevant volumetric visualization generator. The volumetric sources 560 and additional volumetric sources 562 may be pivotably coupled to the wearable computing device 540 and the band 550, respectively. The pivotable coupling may facilitate the movement of the volumetric source and may allow the wearable computing device to instruct or aim the lasers.

Further, the volumetric sources 560 and additional volumetric sources 562 may be reconfigurable to either guide a particle in mid-air or to illuminate the guided particle for viewing. For example, additional volumetric source 562-5 may operate at a particular wavelength to generate a laser that is not visible to the human eye, but is capable of moving (e.g., guiding, tweezing, pulling, pushing, manipulating) a particle in mid-air. Continuing the example, volumetric source 560-5 may operate at a particular wavelength to generate a laser this is visible to the human eye, and that is capable of rendering the particle (e.g., painting, making visible to a human, shading, coloring, providing illumination to) that is being guided by additional volumetric source 562-5. In a second example, volumetric source 560-6 may operate at a particular wavelength to guide a particle in mid-air and volumetric source 560-7 may operate at a particular wavelength to render the particle. In a third example, volumetric source 560-3 may guide a particle and additional volumetric source 562-1 may render the particle.

Figure 5B:
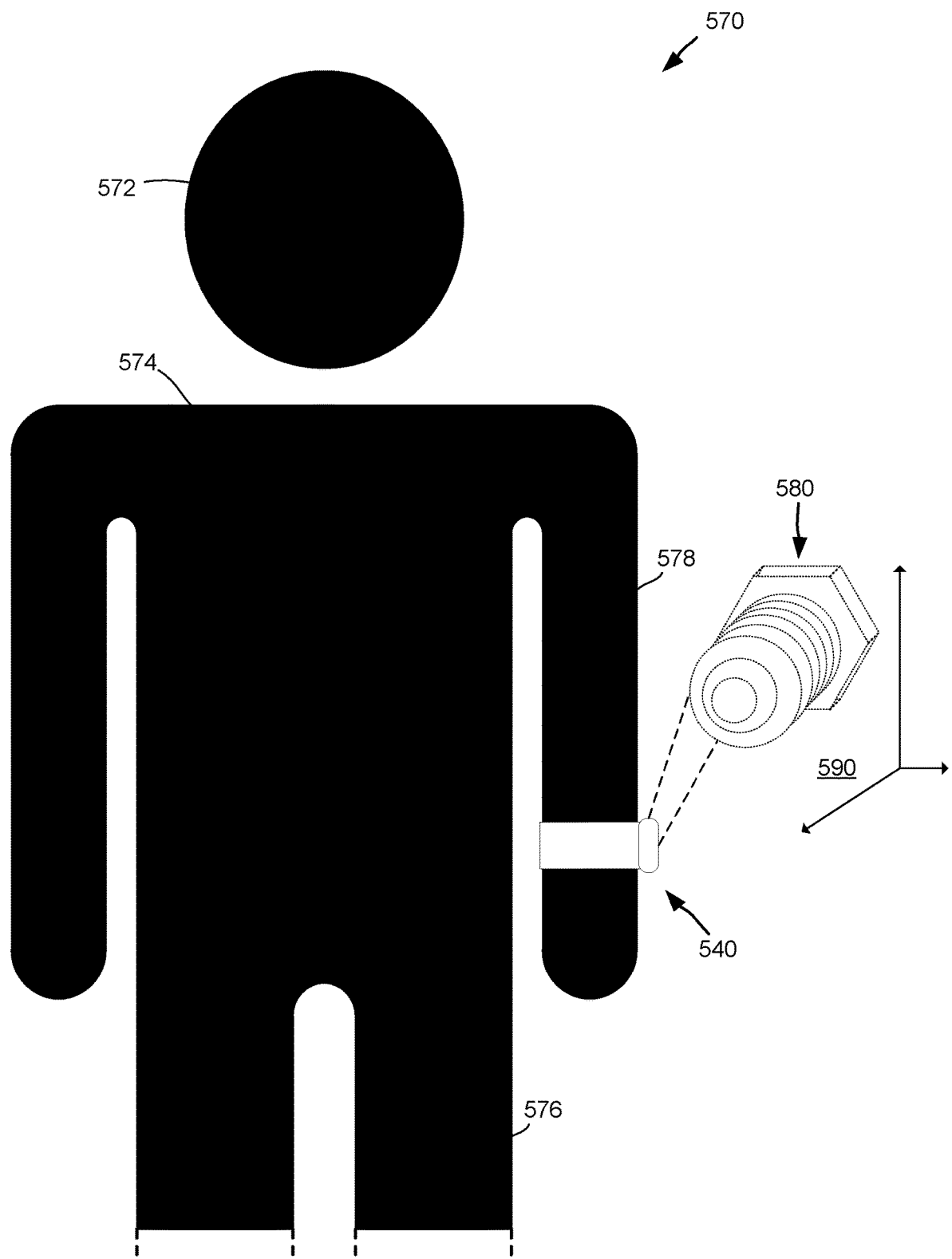
FIG. 5B depicts the example system creating visualizations for a user, consistent with some embodiments of the disclosure.

FIG. 5B depicts the example system 500 creating visualization for a user 570, consistent with some embodiments of the disclosure. User 570 may be wearing wearable computing device 540 to view or consume various volumetric visualizations. Specifically, user 570 may be a human with any or all of the following: a head 572, a torso 574, legs 576, and an arm 578. The user 570 may wear the wearable computing device 540 on a wrist of the arm 578. The wearable computing device 540 may be configured to generate a volumetric visualization 580 in a first position 590.

For example, the volumetric visualization 580 may be of a part, tool, or other widget that is related to a repair task that user 570 wishes to perform. The volumetric visualization 580 may be generated by the volumetric sources 560 and/or the additional volumetric sources 562 of the wearable computing device and/or the band 550, respectively. The processor of the wearable computing device may instruct one of the volumetric sources 560-3 to guide a particle along a path (e.g., tracing, moving, scoring, etching) in mid-air that corresponds to the shape of a widget. The processor of the wearable computing device may instruct a second of the volumetric sources 560-2 to adjust (e.g., angle, aim, follow the path) to direct a visible light for rendering the guided particle as it moves along the path of the shape of the widget. As a result, volumetric visualization 580 may appear and be visible at the first position 590. The first position 590 may be in a three-dimensional space in mid-air. Anyone, including user 570 may be able to view the volumetric visualization 580 from a plurality of angles (e.g., other users in the environment near the first position 590 may also view the volumetric visualization 580).

System 500 may be configured to also perform one or more operations of MVMC. In detail, the wearable computing device 540 and/or the paired computing device 520 may execute one or more algorithms to identify movement of user 570. The movement may be determined from one or more sensors embedded in the wearable computing device 540 or the band 550 (e.g., an accelerometer, a GPS, a gyroscope, a magnetometer, a radar sensor such as a *Soli*, an ultrawideband antenna, an ambient light sensor, LiDAR, a barometer, a proximity sensor).

Based upon an identified movement, the wearable computing device 540 may instruct one or more of the volumetric sources 560 and/or additional volumetric sources 562 to make adjustments. For example, volumetric sources 560-2 may guide a particle along a path and volumetric source 560-3 may illuminate the particle as part of creating the volumetric visualization 580. Upon an identified movement, the wearable computing device 540 may instruct the volumetric sources 560-2 and 560-3 to adjust the creation of the volumetric visualization 580. The adjustment in instruction may be an alteration of a path of the particle. Specifically, if a user moves in a first direction, the wearable computing device 540 may instruct the volumetric sources 560-2 and 560-3 to adjust the path to compensate or invert the first direction, such that the path remains continuous or uninterrupted. As a result of the compensated adjustment, the path of the particle remains constant and the volumetric visualization 580 appears stationary or in the same position 590.

The movement may be identified based on identifying a predetermined movement. The predetermined movement may be based on a user status. For example, a user status may be a user having tremors, a nervous movement, a user being a certain age, a user having a certain skill or physical capability. In another example, a user status may be an activity of a user, such as playing a game, typing on a keyboard, a user moving their legs 576, a user moving their torso 574, a user jumping, and the like.

The wearable computing device 540 may be calibrated by a user, such as user 570. Specifically, an enrollment process or calibration mode may be triggered by user 570. While in the calibration mode, the wearable computing device 540 may operate without generating any volumetric visualizations but may continue to monitor the movement of a user for a period of time (e.g., 10 minutes, an hour, 3 days). The monitored movement may be used to create a profile of the motion of the user. The wearable computing device 540 and/or the paired computing device 520 may also instruct the user 570 to perform actions, such as type on a keyboard, hold an object above their head, hold a leg 576, torso 574, head 572, or arm 578 steady for a few seconds. The wearable computing device 540 and/or the paired computing device 520 may also instruct the user 572 to perform specific movements, such as arcs of movement of the arm 578 (e.g., swinging just the forearm, moving the whole arm, twisting of the wrist, etc.).

In some embodiments, the wearable computing device 540 may update or train a machine learning model, such as providing data from user 570 to a neural network 400. The updated data may then be able to identify a predetermined movement pattern of the user 570 in a future instance. For example, if a user 570 is typing on a keyboard, the movement pattern may not be predetermined, and the motion sensors of the wearable computing device 540 may be read to determine the movement of the user. The system 500 may be able to instruct the volumetric sources 560 and the additional volumetric sources 562 in a near real-time context to maintain the volumetric visualization 580 in the fixed position 590. The data from the movement sensors may be fed into a machine learning model that is housed on the paired computing device 520, and the paired computing device may train the machine learning model. The updated or trained model may be used in future movement of the user 570. For example, if a user 570 begins typing on the keyboard at a time later, the system 500 may recognize the movement by feeding sensor data from the wearable computing device 540 into the model, and consequently identifying the now predetermined movement pattern of the user 570.

In some embodiments, the wearable computing device will select various volumetric sources 560 and additional volumetric sources 562 based on the identified movement of the user. In detail, the user 570 may move their arm 578 and the attached wearable computing device 540 may move around in an environment. Before movement of the arm 578 begins, the wearable computing device 540 may select volumetric source 560-6 and volumetric source 560-7 to create the volumetric visualization 580 at the first position 590 in a three-dimensional space of the environment. Based on an identification of a movement of the user 570, the wearable computing device 540 may adjust the angle, position, arc, patch, direction, or other relevant adjustment of the volumetric source 560-6 and volumetric source 560-7. The adjustment of volumetric source 560-6 and volumetric source 560-7 may result in the volumetric visualization 580 maintaining the first position 590.

The user may continue to move and the wearable computing device 540 may determine that the volumetric source 560-6 and volumetric source 560-7 may no longer be able to create the volumetric visualization 580 (or to maintain the first position 590). The determination may be made based on a range of motion or angle adjustment of the volumetric source 560-6 and volumetric source 560-7 (e.g., each source may have a range of angle adjustment that is within 45 degrees at a distance of 8 inches from the wearable computing device 540). The determination may be made based on predetermined information about the size and shape of the wearable computing device 540 (e.g., the wearable computing device and/or the paired computing device 520 may include specifications such as the size, shape, and dimensions of the outside surface and the position along the outside surface of the wearable computing device). The determination may include identifying that a render path may intersect a portion of the wearable computing device 540. The determination may include identifying an obstruction between the volumetric source 560-6 and volumetric source 560-7, and the volumetric visualization 580 (e.g., a hand of the user 570 or another user, a foreign object, a part of the wearable computing device). Upon determining that the volumetric source 560-6 and volumetric source 560-7 may no longer be able to create the volumetric visualization 580, one or more of the other volumetric sources 560 and additional volumetric sources 562 may be selected. For example, volumetric source 560-8 and additional volumetric source 562-5 may be selected to create volumetric visualization 580 based on a pan, twist, rotation, shake, or other movement of arm 578 of user 570, or based on interference or obstruction of volumetric source 560-6 and volumetric source 560-7.

In some embodiments, the wearable computing device 540 may be configured to protect the vision of a user, such as user 570. In detail, the wearable computing device 540 may execute of software program or application that perform object detection of various features, such as facial detection. The program may be configured to perform gaze tracking, eye movement identification, face detection, feature detection, or another relevant human tracking algorithm. The program may execute on the wearable computing device 540 directly, based on images captured by camera 548. The program may execute on the wearable computing device 540 indirectly. For example, the camera 548 may capture images on wearable computing device 540, and the wearable computing device 540 may transfer the captured images through networks 510 to paired computing device 520. Paired computing device 520 may execute the program and may detect the gaze, view, eyes, or other facial features of a user. The program may determine that a user is looking at the volumetric visualization 580. The program may determine that a user is looking directly at the volumetric sources 560 or additional volumetric sources 562. Based on determining, that a user is looking at a volumetric source 560 or an additional volumetric source 562, the program may instruct the wearable computing device 540 to stop the creation of the volumetric visualization 580. Responsive to the program detection of a user looking at a volumetric source 560 or an additional volumetric source 562, the wearable computing device 540 may terminate the generation of the volumetric visualization 580.

In some embodiments, the wearable computing device 540 may be configured to provide other content to a user. In detail, the wearable computing device 540 and/or the paired computing device 520 may receive notifications, messages, guidance, communications, instructions, or any other textual information. The wearable computing device 540 may be configured to generate a volumetric visualization 580 that also includes the textual information. For example, the volumetric visualization 580 may be of a widget, and a text message from another user may appear etched into the volumetric visualization 580. Based on the size and content of the textual information, the wearable computing device 540 may instruct the volumetric sources 560 or additional volumetric sources 562 to update the volumetric visualization 580 so that the entire textual information is consumable by the user 570 (e.g., the text appears to scroll, rotate, pan, move, repeatedly scroll, etc.). Based on the type of content, the wearable computing device 540 may be configured not to display the content. For example, a natural language processing algorithm, or other relevant machine learning technique, may be used by the wearable computing device 540 and/or paired computing device 520 to determine the semantic meaning in the content. If the meaning of the content is private, based on comparing the determined content to a preexisting set of content flags or filters, the wearable computing device 540 may not create a volumetric visualization 580 with the content. Instead, the wearable computing device 540 may notify the user of the textual information in another manner, playing a sound, displaying the content on the display 546, providing haptic feedback to the user, and the like.

Figure 6:
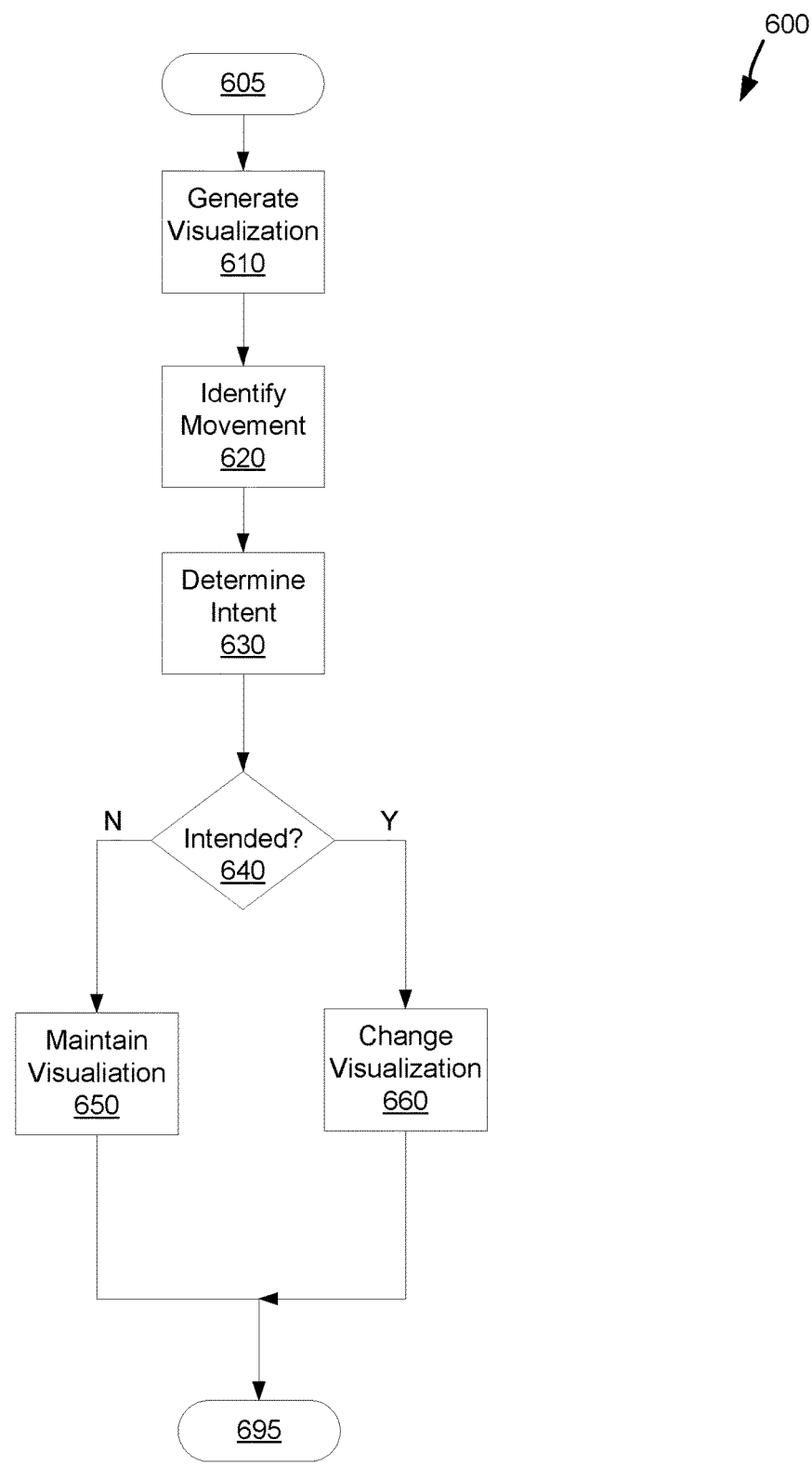
FIG. 6 depicts a method for creating a volumetric visualization from a wearable computing device, consistent with some embodiments of the disclosure.

FIG. 6 depicts a method 600 for creating a volumetric visualization from a wearable computing device, consistent with some embodiments of the disclosure. Method 600 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). One or more operations of method 600 may be performed by a wearable computing device (e.g., wearable computing device 540), a paired computing device (e.g., paired computing device 520), one or more additional computing devices (e.g., servers 530), or some combination.

From start 605, a volumetric visualization may be generated at 610. The visualization may be generated by a volumetric source configured to create the volumetric visualizations, such as a plurality of lasers. The visualization may be generated in mid-air, with reference to a particular coordinate in mid-air of an environment. For example, the visualization may be generated in a first position located in a three-dimensional space that is a few inches or a couple feet away from the volumetric source.

At 620, a movement of the wearable computing device may be identified. The movement may be identified based on one or more sensors. For example, movement sensors embedded in wearable computing device 540 may measure and identify movement of a user that wears the wearable computing device.

At 630, the intent of the movement may be determined. The intent may be determined based on comparing the movement to a predetermined threshold. The predetermined threshold may be a particular distance of movement, a given speed of movement, a magnitude of movement, or other set measurement. For example, a first predetermined threshold may be movement that is over two inches of movement of the wearable computing device over a period of 1,200 milliseconds. In another example, a second predetermined threshold may be multiple twisting movements at an angular velocity of four degrees a second. The determination may be that if a movement of a user is above one or more of the predetermined thresholds, that the movement is an intended movement. The determination may be that if a movement of a user is less than one or more of the predetermined thresholds, that the movement is an unintended movement. The determination may be based on a movement of a user that is a deviation of a predetermined movement or characteristic of a user. For example, a user may have a user status such as an unintentional shaking or unsteady movement, due to age, infirmary, medical condition, or another characteristic. The characteristic of the user may include the user moves within a particular range of twisting and panning of a couple degrees and a few millimeters, respectively. The user moving beyond our outside of that particular range, may be a deviation of a predetermined threshold, and may be an indicator of an intentional movement.

Based on identification of the movement, the volumetric sources may be adjusted.

If the movement is not intended at 640:N, the volumetric sources may be adjusted to maintain the volumetric visualization at 650. Specifically, the adjusting the volumetric sources may include adjusting the volumetric source such that the volumetric visualization appears fixed in the three-dimensional space. For example, adjusting an angle of a volumetric source, or selecting a new volumetric source to create the volumetric visualization, such that it appears that the volumetric visualization does not appear to shake, rotate, judder, or otherwise move from the perspective of a user.

If the movement is intended at 640:Y, the volumetric sources may be adjusted to change the visualization at 660. The change of the visualization may include panning, tilting, rotating or otherwise moving the visualization from the viewpoint or perspective of the user. The change of the visualization may include updating the actual scale or detail of the visualization. For example, based on a movement that is determined to be intentional, a visualization may be updated by scrolling information that is rendered on the surface of the visualization, or by providing additional detail or a zoomed or more intricate view of the visualization or a part of the visualization.

After the visualization is maintained at 650, or changed at 660, method 600 may end at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    generating, by a wearable computing device, a rotatable volumetric visualization at a first position that is located in a three-dimensional space in mid-air, wherein the wearable computing device includes at least one volumetric source configured to create the volumetric visualization,
    wherein the wearable computing device includes one or more sensors configured to determine movement of the wearable computing device;
    identifying, by a machine learning model for volumetric visualization movement compensation communicatively coupled to the wearable computing device, a movement of the wearable computing device;

determining an intent of the identified movement by the machine learning model; and adjusting, by the wearable computing device based on the identified movement and the intent of the identified movement, the at least one volumetric source.

2. The method of claim 1, wherein the volumetric source is configured to trace a path during the creation of the volumetric visualization during a period of time, and wherein the adjusting the at least one volumetric source includes:

adjusting, by the wearable computing device and during the period of time, the path of the at least one volumetric source.

3. The method of claim 1, wherein the wearable device is worn by a user, and wherein the movement includes the user moving.

4. The method of claim 3, wherein the method comprises:

identifying, based on the machine learning model, a predetermined movement pattern of the user; and adjusting, based on the predetermined movement pattern, the at least one volumetric source of the wearable computing device to create the volumetric visualization.

5. The method of claim 4, wherein the method further comprises:

training, based on a movement corpus, the machine learning model wherein the movement corpus includes movements of users having a similar status to the user, and wherein the movement corpus includes previous movements of the user.

6. The method of claim 1, wherein the movement is a rotation of the wearable device.

7. The method of claim 6, wherein the adjusting the at least one volumetric source includes changing the angle of the at least one volumetric source during a rendering of the volumetric visualization.

8. The method of claim 1, wherein:

the wearable device includes a plurality of volumetric sources disposed on an outer surface of the wearable device, wherein a first volumetric source of the plurality of volumetric sources is one of the at least one volumetric source, and the method further comprises:

identifying a render path of the volumetric visualization, wherein the render path begins at the wearable device, and wherein the render path extends through the three-dimensional space to the first position;

determining an obstruction in the render path, the obstruction between the first volumetric source and the first position; and selecting, based on the obstruction and based on a current placement of the wearable computing device, a second volumetric source of the plurality of volumetric sources for generating the volumetric visualization.

9. The method of claim 1, wherein the wearable computing device includes an optical sensor configured to determine a gaze of one or more users; and wherein the method further comprises:

detecting, by the wearable computing device and based on the optical sensor, a first gaze of a first user;

determining, by the wearable computing device, the first gaze is the first user looking at one of the at least one the volumetric source; and terminating, by the wearable computing device, the generating of the volumetric visualization.

10. The method of claim 1, wherein the method further comprises:

determining the movement of the wearable computing device is an unintentional movement of a user that wears the wearable computing device, and wherein the adjusting the at least one volumetric source includes adjusting the at least one volumetric source such that the volumetric visualization appears fixed in the three- dimensional space.

11. The method of claim 1, wherein the method further comprises:

determining the movement of the wearable computing device is an intentional movement of a user that wears the wearable computing device, and wherein the adjusting the at least one volumetric source is such that the appearance of the volumetric visualization from a perspective of the user is selected from the group consisting of panning, tilting, rotating, zooming, and scrolling in the three-dimensional space.

12. The method of claim 11, wherein the determining the movement is an intentional movement is based on a deviation from a predetermined threshold of one or more characteristics of the user.

13. The method of claim 1, further comprising:

inspecting by the wearable computing device a content of a user of the wearable computing device before the content is rendered in a mid-air volumetric visualization;

recognizing, by the machine learning model, a privacy level of the content; and omitting the content from the mid-air volumetric visualization when the privacy level of the content exceeds a predetermined threshold.

14. The method of claim 13, wherein the machine learning model is configured with a semi-supervised learning technique where the user pre-identifies privacy levels for information types.

15. A system, the system comprising:

a memory, the memory containing one or more instructions; and a processor, the processor communicatively coupled to the memory, the processor, in response to reading the one or more instructions, configured to:

generate, by a wearable computing device, a rotatable volumetric visualization at a first position that is located in a three-dimensional space in mid-air, wherein the wearable computing device includes a volumetric source configured to create the volumetric visualization, wherein, the wearable computing device, includes one or more sensors configured to determine movement of the wearable computing device;

identify, by a machine learning model for volumetric visualization movement compensation communicatively coupled to the wearable computing device, a movement of the wearable computing device;

determine an intent of the identified movement by the machine learning model; and adjust, by the wearable computing device based on the identified movement and the intent of the identified movement, the volumetric source.

16. The system of claim 15, wherein the wearable device is worn by a user, and wherein the movement includes the user moving.

17. The system of claim 16, wherein the processor is further configured to:

identify, based on the machine learning model, a predetermined movement pattern of the user; and adjust, based on the predetermined movement pattern, the volumetric source of the wearable computing device to create the volumetric visualization.

18. A computer program product, the computer program product comprising:

one or more computer readable storage media; and program instructions collectively stored on the one or more computer readable storage media, the program instructions configured to:

generate, by a wearable computing device, a rotatable volumetric visualization at a first position that is located in a three-dimensional space in mid-air, wherein the wearable computing device includes a volumetric source configured to create the volumetric visualization, wherein, the wearable computing device, includes one or more sensors configured to determine movement of the wearable computing device;

identify, by a machine learning model for volumetric movement compensation communicatively coupled to the wearable computing device, a movement of the wearable computing device;

determine an intent of the identified movement by the machine learning model; and adjust, by the wearable computing device based on the identified movement and the intent of the identified movement, the volumetric source.

19. The computer program product of claim 18, wherein the wearable device is worn by a user, and wherein the movement includes the user moving.

20. The computer program product of claim 19, wherein the program instructions are further configured to:

identify, based on the machine learning model, a predetermined movement pattern of the user; and adjust, based on the predetermined movement pattern, the volumetric source of the wearable computing device to create the volumetric visualization.

* * * * *